June 30, 1964 W. H. PRICE ETAL 3,138,910
ROTARY MOWER ENGINE MUFFLER
Filed April 17, 1963 3 Sheets-Sheet 1

INVENTORS.
WARREN H. PRICE
BY VERNON R. KAUFMAN

Lieber & Nilles
ATTORNEYS

June 30, 1964  W. H. PRICE ETAL  3,138,910
ROTARY MOWER ENGINE MUFFLER

Filed April 17, 1963  3 Sheets-Sheet 2

INVENTORS.
WARREN H. PRICE
VERNON R. KAUFMAN
BY

Lieber & Nilles
ATTORNEYS

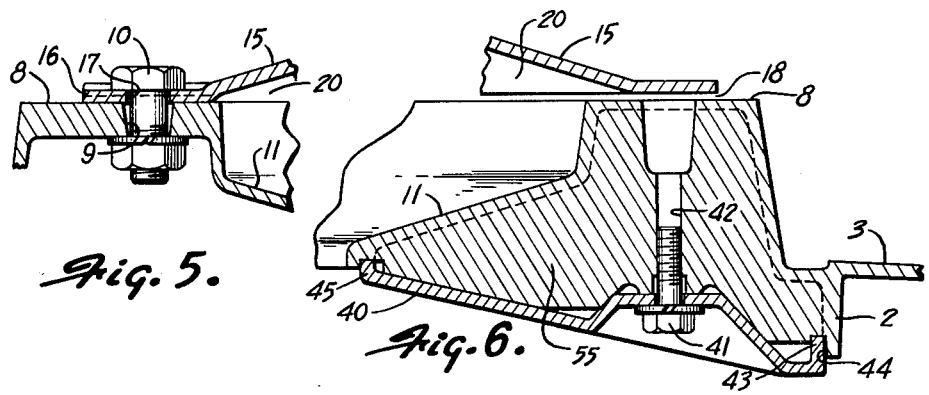
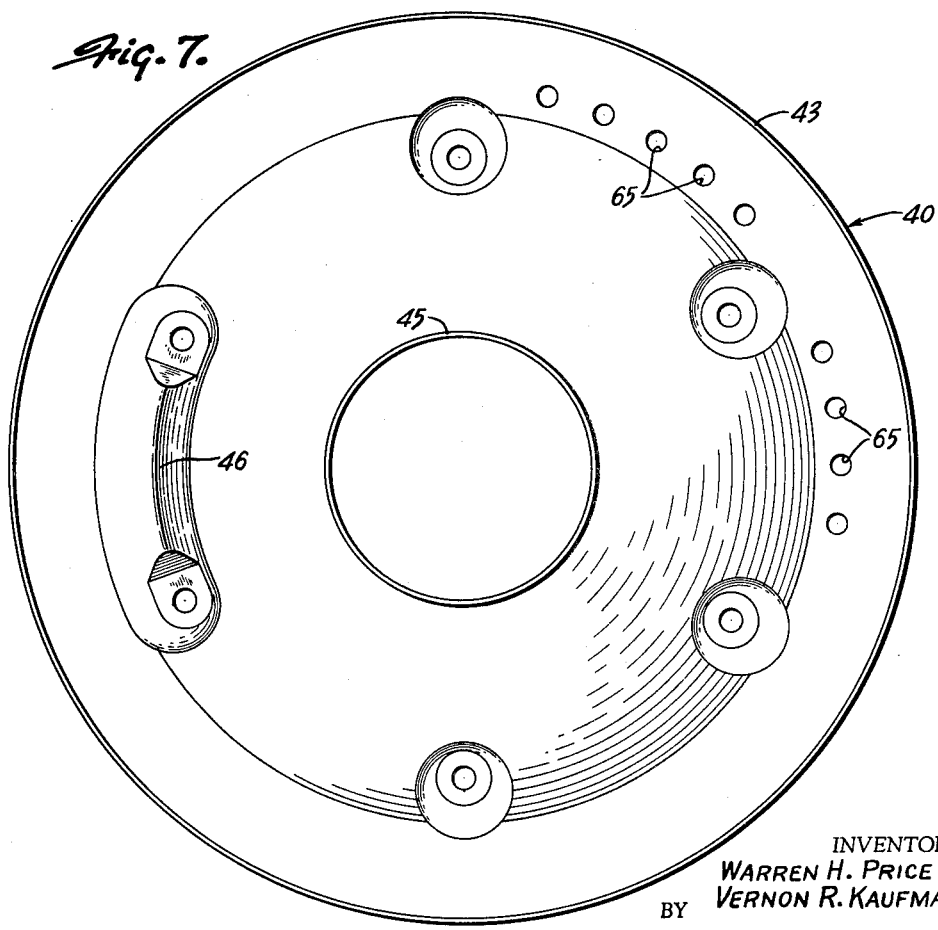

3,138,910
ROTARY MOWER ENGINE MUFFLER
Warren H. Price, South Milwaukee, and Vernon R. Kaufman, Racine, Wis., assignors to Jacobsen Manufacturing Company, Racine, Wis., a corporation of Wisconsin
Filed Apr. 17, 1963, Ser. No. 273,669
5 Claims. (Cl. 56—25.4)

This invention relates generally to rotary mowers and more particularly to an improved muffler construction for the internal combustion engine of such a mower.

A serious problem in prior art devices of this character has been that of heat dissipation from the engine, that is, the concentration of heat transmitted to the crankcase.

Another problem has been that of noise of the muffler, due among other things, to vibration and flexing of the sheet metal parts, and vibration transmitted through still other parts.

Accordingly, the present invention provides a rotary mower muffler construction which will greatly reduce the above-mentioned difficulties.

One aspect of the present invention relates to a muffler construction for a rotary mower in which the engine exhaust is muffled through a series of chambers and is finally passed through the grass conveying tunnel of the mower all in a particularly efficient and effective manner. As the exhaust is discharged into this tunnel, there is no back pressure against it, and in fact it is introduced into an area of sub-atmospheric pressure, which results in particularly good efficiency of engine operation.

The present muffler construction finds exceptional utility and close cooperation with a particularly shaped wind tunnel, to thereby result in an efficient conveying action of the exhaust.

The rotary mower muffler construction provided by the present invention divorces the engine to a considerable extent from the housing and in such a manner that (1) heat is not readily conducted back to the engine crankcase, (2) the engine mounting and the mower housing, particularly at the muffler junction, can shift relative to one another within limits as required by expansion and contraction of the parts, (3) the said juncture is well insulated against heat transfer, and (4) a horizontally large dead area is provided between the engine mounting and the mower housing which serves to effectively dampen much noise and vibration.

These and other objects and advantages will appear more fully as this disclosure progresses, reference being had to the accompanying drawings, in which:

FIGURE 5 is a fragmentary, vertical view, in section and taken along line 5—5 in FIGURE 2, but on an enlarged scale;

FIGURE 6 is a fragmentary, vertical view, in section and taken along line 6—6 in FIGURE 2, but on an enlarged scale; and FIGURE 7 is a top plan view of the muffler cover shown in FIGURE 1, but on an enlarged scale.

Figure 2:
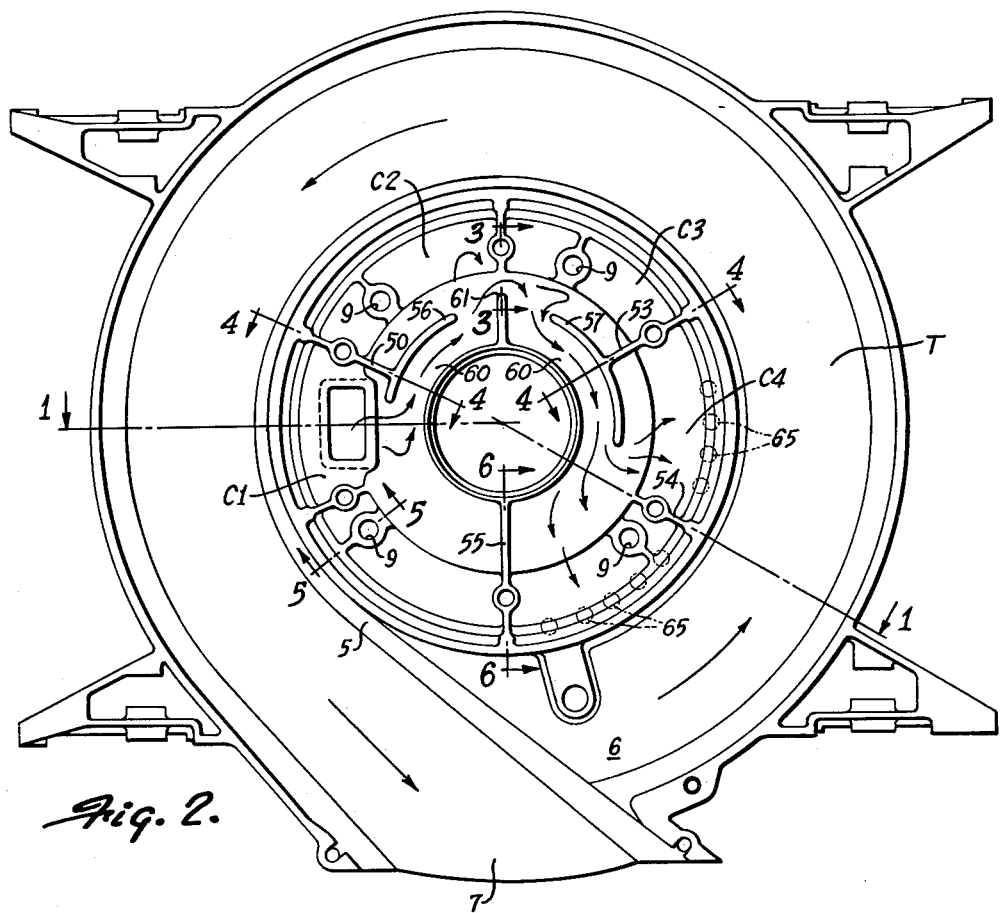
FIGURE 2 is a bottom view of the mower housing shown in FIGURE 1, but with the rotary blade and muffler cover removed and on a reduced scale.
Figure 3:
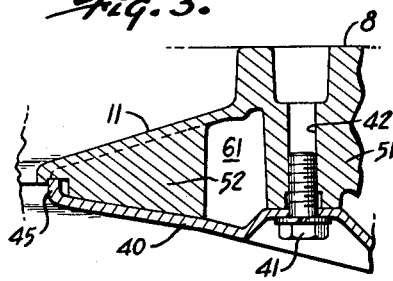
FIGURE 3 is a fragmentary, vertical sectional view taken along line 3—3 in FIGURE 2, but on an enlarged scale.
Figure 4:
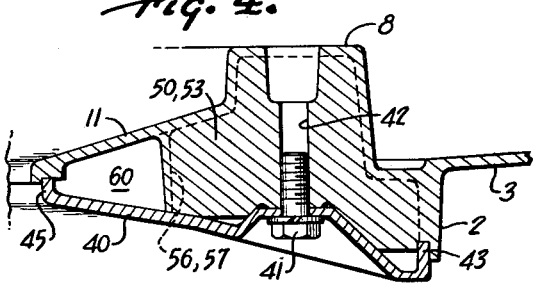
FIGURE 4 is a fragmentary, vertical view, in section and taken along either one of lines 4—4 in FIGURE 2, but on an enlarged scale.

Referring in greater detail to the drawings, the mower housing H is cast as one piece and has a generally vertical outer wall 1, a generally vertical inner wall 2, and a top wall 3 which together define a tunnel T of inverted and generally U-shape cross-sectional form. As shown in FIGURE 2, these walls form a circular tunnel for the majority of their length and then flare tangentially beginning at about point 5. Walls 1 and 2 become of increasingly greater height as they extend from point 6 and then in a direction of travel of the rotary blade unit B, as indicated by the curvilinear arrow, until they terminate at the discharge end 7 of the tunnel.

A tunnel T is thereby provided which is of constant width until it tangentially flares adjacent its discharge end, and is of increasingly greater height for its entire length.

The action of the cone-shaped blade assembly B as it rapidly rotates in the housing creates an area of sub-atmospheric pressure at the beginning of the tunnel as indicated generally at 6.

The housing also has an upper, annular ring-like flat surface 8 (FIGURES 1 and 5) of rather narrow width and in which are four circumferentially spaced apertures 9 which receive the engine mounting bolt means 10.

A downwardly extending and relatively wide, dish-shaped central portion 11 also forms part of the housing and has a central aperture 12, through which the central portion 13 of the blade assembly B extends.

If a more complete description of the housing is deemed to be either necessary or desirable, reference may be had to the co-pending U.S. application Serial Number 225,701, filed September 24, 1962, and now Patent No. 3,112,596 issued December 3, 1963, and entitled, "Rotary Mower Cleansing Means."

An internal combustion engine E is mounted by its base 15 and bolt means 10 to the surface 8 of the housing. The underside of the base has a raised boss 16 (FIG. 5) around each of the four apertures 17 which extend through the base, and these apertures are aligned with apertures 9 of the housing.

It will be noted that the base is secured only at three or four locations, dependent upon the type of engine, adjacent the outside edge only of the base.

An air gap 18 is provided between the majority of the engine base and housing, and this gap permits escape of heat from the otherwise substantially enclosed space 20 between the upwardly extending inverted dish-shaped base and the complementary downwardly extending, dish-shaped portion 11 of the housing.

This circular 20 has a diameter greater than one-half that of the outer diameter of the surface 8, and provides a cushioning effect for the vibration and noise generated by the engine. Stated otherwise, the circular portion 11 has a diameter greater than one-half of the diameter of the circular inner wall 2, and the height of said portion 11 is less than one-half the height of said housing.

The vertical drive shaft 22 of the engine is fixed by the cap bolt 23 and key 24 in driving relationship with portion 13 of the blade assembly. A clearance space exists between portion 13 and aperture 12 of the housing.

In order for any heat from the housing to be conducted back up to the engine, it must travel through portion 11, through the narrow surface 8, through bosses 16 and then through the base itself.

Furthermore, by providing a large space 20 at the central portion of the housing, various makes of engines (not shown) can be accommodated, some of which may have downward projections that would otherwise interfere with the housing.

The engine exhaust passage 30 (FIGURE 1) is placed in communication with the muffler M formed in the housing via the aligned openings 31 and 32 of the base 15 and housing H, respectively. Flexible gaskets 33 and 34 are located between engine and base, and between the base and housing, respectively. No bolt means are used in this exhaust passage area to fasten the parts together, and as engine, base and housing may become quite hot in this location of the exhaust passage, considerable shifting or relative expansion of these parts may occur in this area without damage thereto. In other words, a tight seal is provided between exhaust passages 30, 31 and 32, but the parts are not rigidly held together here.

The muffler area M in general is defined by the inside of inner wall 2, the central portion 11, the top side of the housing, and a muffler cover 40 which is secured by bolts 41 threaded into apertures 42 in the underside of the housing. This cover is formed as a sheet metal stamping and its outer peripherally flanged edge 43 abuts tightly in the counterbore 44 at the lower end of wall 2. The generally flat and dish-shaped cover has a central opening which is defined by an upwardly turned edge 45 that seats snugly around the lower shouldered end of portion 11.

Figure 1:
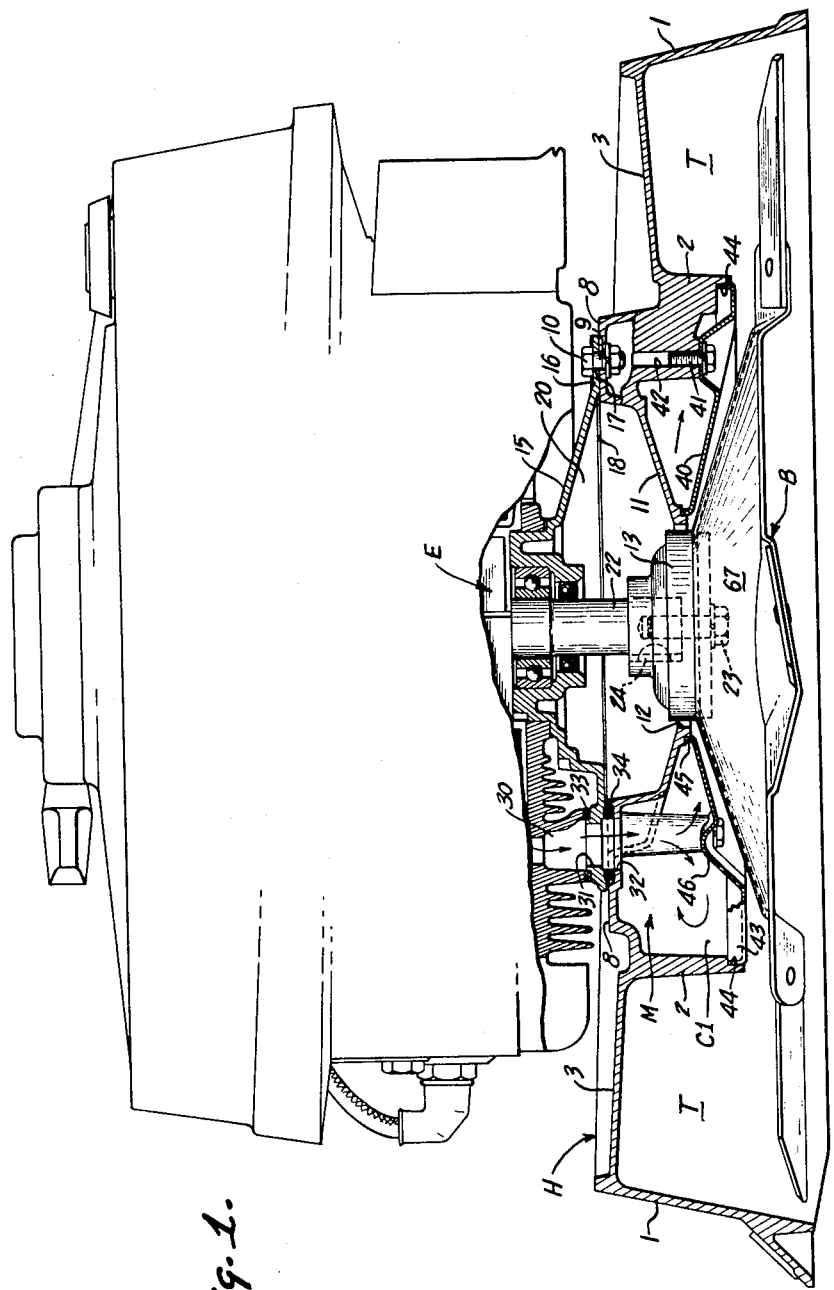
FIGURE 1 is an elevational view of a mower embodying the present invention, the view being partially in section and taken along line 1—1 in FIGURE 2.

It will be noted that the cover has a crowned or raised portion 46 extending upwardly into the muffler area and located directly below the exhaust passage 32. As indicated in FIGURE 1, by the arrows, the high velocity exhaust as it is directed downwardly is deflected in different directions by the raised portion. This prevents vibration and flexing of the sheet metal cover and as well as thereby reducing the noise level, it also disperses the exhaust in the muffler.

A series of separate muffler chambers C1, C2, C3 and C4 are defined between the underside of the housing, and the muffler cover by means of the radial ribs 50, 51, 52, 53, 54 and 55, and the arcuate ribs 56 and 57. Chambers C1 and C2 are in communication with one another through passage 60; chamber C2 communicates with chamber C3 via passage 61 located between radial ribs 51 and 52; chamber C3 and chamber C4 have passage 60 therebetween; chamber C4 is shielded from chamber C1 by the full rib 55 (FIGS. 2 and 6).

In this manner a tortuous path is formed, as indicated by the dotted arrows in FIGURE 2, for the exhaust, and it is discharged into the tunnel via small apertures 65 in the cover.

The exhaust enters the tunnel adjacent its small or beginning end where there is sub-atmospheric pressure and then travels through the long tunnel which is constant width, ever increasing height in cross section and acts as a final muffler chamber.

By the time the exhaust has completed the above described tortuous path through the various chambers, it has been greatly reduced in sound and velocity.

The upper dish-shaped member 67 of the blade assembly B complements the shape of the muffler cover. As shown in FIGURE 1, member 67 is nested in the cover and rotates directly beneath it.

The relatively flat muffler construction which extends across the majority of the diameter of the housing and is located within the inner wall that in part defines the clippings tunnel, functions to enclose the central portion of the interior of the mower housing. As a result, the blade assembly is much more efficient in picking up and carrying clippings than it would otherwise be if the central portion of the mower housing was open and unrestricted.

Various modes of carrying out the invention are contemplated as being within the scope of the following claims particularly pointing out and distinctly claiming the subject matter which is regarded as the invention:

We claim:

1. A rotary mower having a housing including downwardly extending and generally concentric circular, inner and outer walls which together define an annular tunnel for the confinement and passage of clipping for ultimate discharge from the mower; said tunnel being of a relatively small cross section at its beginning end and increasing in cross section towards its discharge end, said inner wall terminating in a lower edge that is approximately half-way below the height of said housing; said housing also having a central, downwardly extending and flat dish-shaped portion which terminates in a lower edge that defines a central opening; said dish-shaped portion having a diameter that is greater than one-half the diameter of said circular inner wall, said portion having a height less than one-half of the height of said housing, a generally flat and inverted dish-shaped cover secured between and to the lower edges of said inner wall and portion to thereby define a muffler chamber with said inner wall and dish-shaped portion, an engine base secured on top of said housing so as to define with said portion a substantially enclosed space for insulating an engine carried on said base from said portion, an exhaust passage from said engine and in communication with said chamber, and apertures in said cover placing said chamber in exhaust discharging communication with the small beginning end of said tunnel.

2. A rotary mower having a housing including downwardly extending and generally concentric circular, inner and outer walls which together define an annular tunnel for the confinement and passage of clippings for ultimate discharge from the mower; said tunnel being of a relatively small cross section at its beginning end and increasing in cross section towards its discharge end, said inner wall terminating in a lower edge that is at least half-way below the height of said housing; said housing also having a central, downwardly extending and flat dish-shaped portion which terminates in an opening defining lower edge; a generally flat and inverted dish-shaped cover secured between and to the lower edges of said inner wall and portion to thereby define a muffler chamber with said inner wall and dish-shaped portion, an exhaust passage from said engine and in communicatition with said chamber, and apertures in said cover placing said chamber in exhaust discharging communication with the small beginning end of said tunnel.

3. A rotary mower having a housing including downwardly extending and generally concentric circular, inner and outer walls which together define an annular tunnel for the confinement and passage of clippings for ultimate discharge from the mower; said tunnel being of a relatively small cross section at its beginning end and increasing in cross section towards its discharge end, said inner wall terminating in a lower edge that is at least half-way below the height of said housing; said housing also having a central, downwardly extending and flat dish-shaped portion which terminates in an opening defining lower edge; a generally flat and inverted dish-shaped cover secured between and to the lower edges of said inner wall and portion to thereby define a muffler chamber with said inner wall and dish-shaped portion, an engine base secured on top of said housing so as to define with said portion a substantially enclosed space for insulating an engine carried by said base from said portion, an exhaust passage from said engine and in communication with said chamber, and apertures in said cover placing said chamber in exhaust discharging communication with the small beginning end of said tunnel.

4. A rotary mower having a housing including a downwardly extending, circular, inner wall which terminates in a lower edge that is substantially half-way below the height of said housing; said housing also having a central, downwardly extending and dish-shaped portion which terminates in a lower edge that defines a central opening; an inverted dish-shaped cover secured between said lower edges to thereby define a muffler chamber with said inner wall and dish-shaped portion, an engine base, an engine mounted on said base, said base secured on top of said housing so as to define with said portion a substantially enclosed space for insulating said engine from said portion, a drive shaft extending downwardly from said engine and through said space, and a blade assembly secured to the lower end of said shaft, said assembly including a dish-shaped member which complements and is nested in said cover for rotation directly therebeneath.

5. A rotary mower having a housing including downwardly extending and generally concentric circular, inner and outer walls which together define an annular tunnel for the confinement and passage of clippings for ultimate discharge from the mower; said inner wall terminating in a lower edge that is at least half-way below the height of said housing; said housing also having a central, downwardly extending and flat dish-shaped portion which terminates in a lower edge that defines a central opening; a generally flat and inverted dish-shaped cover secured between and to the lower edges of said inner wall and portion to thereby define a muffler chamber with said inner wall and dish-shaped portion, an engine base, an engine mounted on said base, said base secured on top of said housing so as to define with said portion a substantially enclosed space for insulating said engine from said portion, a drive shaft extending downwardly from said engine and through said space, and a blade assembly secured to the lower end of said shaft, said assembly including a dish-shaped member which complements and is nested in said cover for rotation directly therebeneath.

References Cited in the file of this patent
UNITED STATES PATENTS

| | | |
|---|---|---|
| 2,675,662 | Kroll | Apr. 20, 1954 |
| 2,774,439 | Chesser | Dec. 18, 1956 |

FOREIGN PATENTS

| | | |
|---|---|---|
| 220,092 | Australia | Feb. 6, 1959 |